May 2, 1939.  S. MENDELSOHN ET AL  2,156,433
CAMERA FOCUSING DEVICE
Filed Nov. 25, 1936  2 Sheets-Sheet 1
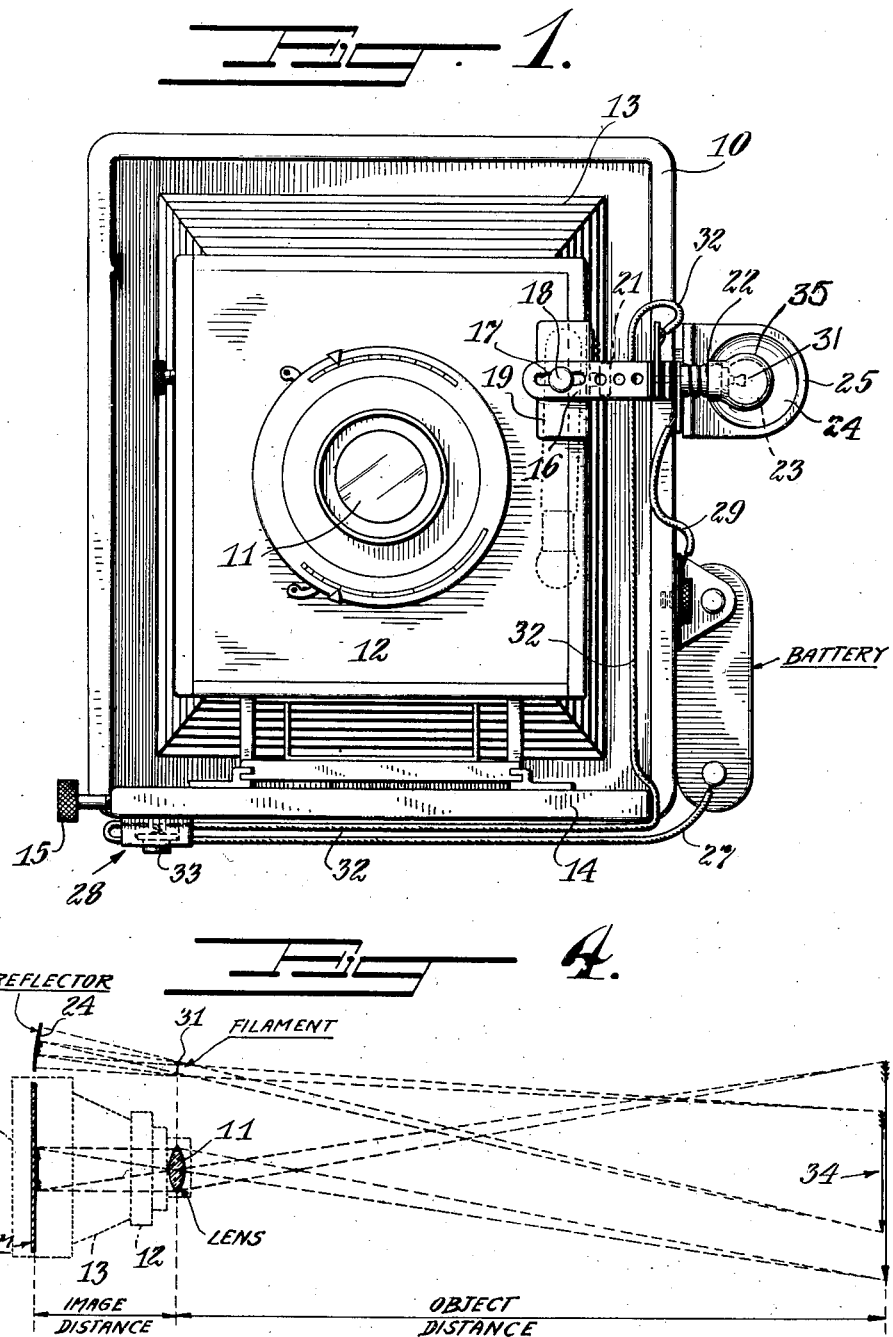
INVENTOR
S. MENDELSOHN
L. HARTMAN
BY
ATTORNEY

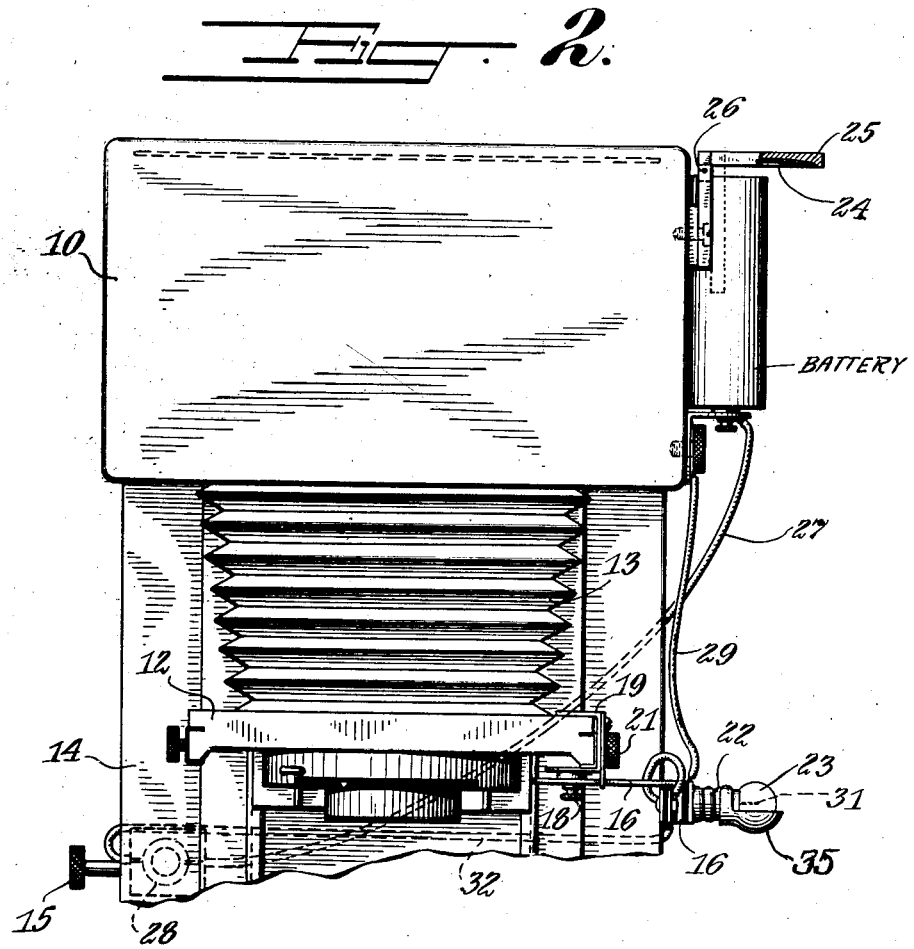
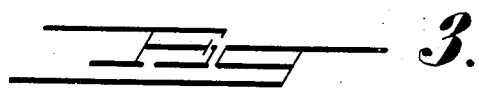

UNITED STATES PATENT OFFICE 2,156,433

CAMERA FOCUSING DEVICE

Samuel Mendelsohn, Brooklyn, and Leon Hartman, New York, N. Y.

Application November 25, 1936, Serial No. 112,636

7 Claims. (Cl. 95—44)

This invention relates to a focusing device and relates more particularly to a simple and effective arrangement of parts applicable to a camera for conveniently determining the proper focal distance at which to make an exposure.

The present apparatus is operable with any camera in which the lens is movable relative to the negative.

It is well known that in the taking of pictures it is of importance to properly determine the distance of the object from the camera film or plate and with a camera fitted with a ground glass the object is viewed in the glass and focused accordingly. Obviously the use of a ground glass requires an appreciable amount of illumination to reveal the object and in cases where the object is dark, as when taking pictures with photoflash bulbs or powder or the like, the ground glass is of little value. Furthermore, in newspaper photography where quick action is essential the use of a ground glass is in many cases a disadvantage since it requires the entire attention of the operator leaving him unaware of surrounding conditions. Furthermore, when using a ground glass, objects are inverted and difficult to keep in focus particularly when in motion.

In accordance with the present invention means are provided in the form of a light source and a reflector so constructed and arranged that an image of the light source may be projected on an object and as the lens of the camera is adjusted to bring it into proper focal relation to the negative the image is brought to a sharp definition giving visible indication to the operator that the proper focal length has been attained.

In accomplishing the above it has heretofore been proposed to utilize a supplemental lens mounted adjacent to the camera lens and to provide a light source offset with respect to lens and adjacent to the negative; the light from the source being directed by means of a mirror to the supplemental lens.

In a structure of the above character it is necessary to provide an expensive supplemental lens and mounting equipment therefor. Obviously the supplemental lens must be of relatively large size and a cumbersome mounting for a tube or bellows is necessary, adding to the expense which in a device of the present character is an economic disadvantage. Furthermore, the light loss is considerable through absorption when passing through the supplemental lens.

In a device of the present type it is necessary to conserve the light energy since the device must be portable and the source of electrical energy is limited.

The present invention provides a device in which a light source is carried on a camera bellows adjacent to and in the same plane as the lens. A reflector is mounted on the camera box in the plane of the film or plate and is preferably formed with a concave surface shaped to direct rays from the light source for convergence at a distance in accordance with the focal distance of the camera lens. The reflector is so arranged that it may be adjusted with respect to the light source to direct the light rays to a point which coincides with a selected position on the object. Thus when the image is projected on the object or objects to be photographed the position of the image will give visible indication of the proper centering of the object or location of the areas to be included as determined by the finder.

As will be evident from the following description the present device makes it possible to align the camera vertically. This is accomplished by employing a light source in the form of a straight line filament positioned vertically so that when the image of the filament is projected on an object the straight line image may be compared with any vertical portion of the object thus giving the operator visible indication of the position of the camera with respect to the object or objects being photographed.

The above and other features and objects of the invention will be apparent from the following description together with the accompanying drawings, in which:

Fig. 1 is a front elevational view of a camera equipped with a focusing device constructed in accordance with the present invention;

Fig. 2 is a top plan view of the camera shown in Fig. 1;

Fig. 3 is a diagram of the wiring circuit for the flow of electrical energy to light the lamp used as a light source, and Fig. 4 is a diagrammatic view showing the relative positions of the light source and reflector with dotted lines indicating the relative focal lengths of the reflector and camera lens.

Although the present invention may be applied to various types of cameras the selected embodiment of the device is attached to a box camera 10 having the usual lens 11 mounted in a face plate 12 at one end of a bellows 13. When the camera is open ready for the exposure of a film the face plate 12 is supported on a hinged cover 14 having the usual tracks and guide and a rotatable finger piece 15 is provided for causing a movement of the face plate away from or into closer relation to the plate or negative holder as is common in standard cameras.

The present device may be made as part of the standard camera equipment or as shown may include a removable arm 16 one end of which is provided with a slot 17 to receive a set screw 18 which threadedly engages a plate or clamp 19 removably attached to the face plate by a tap bolt 21. The other end of arm 16 is provided with a suitably insulated socket 22 to receive the screw base of an incandescent electric lamp 23. The socket 22 is so positioned that when a lamp is in place therein the filament of the lamp will lie in the same plane as the camera lens 11, or in approximately the same position with reference to the reflector that the lens bears to the focal plane of the camera. The arm 16 extends from the face plate so that the lamp 23 may be disposed in line with a reflector 24 mounted in a recessed plate 25 hinged at 26 so that it may be folded or closed to protect the reflector when not in use.

The reflector is preferably ground with a concave surface so shaped as to have the same focal length as the lens 11 and may be removable for the substitution of a different focal length reflector when a different focal length lens is substituted in the camera. A dry cell battery is mounted in a holder secured to the camera and one pole of the battery is connected to a conductor 27 leading to one side of a switch 28 conveniently located beneath the cover plate 14.

The other pole of the battery is connected by means of conductor 29 to one side of the filament 31. The filament may, as shown, be what is generally termed a concentrated light source and in the form of a straight line with right angle terminals to give a distinct image and may be positioned to lie in a plane parallel to the plane of the reflector. The other side of the filament may be connected by conductor 32 to the other side of switch 28.

The switch may be normally open and may be closed by means of a push button 33 convenient to the operator. When the camera is held for an exposure the switch may be held closed so that the projected image of the filament will be maintained as long as required.

As shown the filament 31 is in the form of a straight line which may be positioned coincident with a line parallel with the plane of the film or plate. The image of the filament when projected on an object is many times longer than the actual filament giving a convenient standard of comparison for the operator to use to vertically align the camera thus insuring the proper symmetrical arrangement of the objects with respect to the border lines of the negative.

When operating the device the camera may be held in the usual manner and the operator may hold the switch closed to light the lamp. Referring to Fig. 4 it will be noted that the reflector 24 is so adjusted that the image of the filament may be directed to fall on the center of the object 34 thus assuring proper centering of the picture on the negative.

The light rays emitted from the filament fall on the reflector 24 and are reflected past the light source to produce an image. Since the focus of the curvature of the reflector and the focus of the lens are the same the projected image falling on an object will, if the object is at a point out of focus, be blurred or indistinct.

As the face plate of the camera carrying the lamp is moved to bring the object into focus the image of the filament becomes more distinct and when the proper focal point is reached the image is well defined and sharp thus the proper position of the camera lens with respect to the negative is conveniently and quickly determined.

Inasmuch as the lamp is not burning continually and the actual burning time is relatively short it has been found desirable to use a filament so proportioned that it burns above the set rating at shorter life but giving an excess of brightness or illumination so that an image may be projected even in bright daylight.

For the purpose of utilizing the light rays from all sides of the filament a parabolic reflector 35 is employed. This reflector also serves as a shield to prevent the projection of light rays toward the object.

The present invention makes it possible to provide a convenient focusing device at nominal cost and by reason of the simplicity of parts may be used by the unskilled, as well as the highly trained, photographer.

Although a preferred embodiment of the invention is shown and described herein, it is to be understood that modifications may be made therein without departing from the spirit and scope of the appended claims.

What is claimed is:

1. A focus indicating device for a camera having a lens movable relative to a holder for a photographically sensitive element, comprising a light source in fixed relation to and movable with said lens and a curved surface reflector mounted on said holder for reflecting light rays past said light source to project an image of said light source on an object.

2. A focusing device for a camera having a lens mounted in a support adjustable relative to a photographically sensitive element holder, comprising an incandescent lamp with the filament disposed in the plane of said lens, said lamp being secured in fixed relation to said lens and movable therewith, a concave reflector mounted on said holder for reflecting light rays past said lamp and having a surface curvature to provide a focal length equal to the focal length of said lens.

3. A focus indicating device for a camera having a lens movable relative to a holder for a photographically sensitive element, comprising an incandescent electric lamp having a straight line filament, means for mounting said lamp in fixed relation to and adjacent to said lens with said filament positioned in parallel to the normal vertical axis of the camera, a concave reflector mounted on said holder so positioned as to reflect light rays past said lamp and project an image of said filament on a surface to be photographed said image serving by reason of its vertical position to give visible indication of the position of the camera.

4. A focusing device for a camera having a lens mounted in a support adjustable relative to a holder for a photographically sensitive element, comprising an incandescent lamp with the filament secured in fixed relation to and in the plane of said lens and movable therewith, a concave reflector mounted on said holder for reflecting light rays past said lamp and having a surface curvature to provide a focal length equal to the focal length of said lens and means for holding said reflector to project an image of said filament substantially central with the area to be exposed to said sensitive element.

5. A focusing device for a camera comprising a housing having a plate holder and a lens carried at one end of and movable with a bellows, an incandescent filament lamp, an adjustable bracket for said lamp mounted on said end of the bellows whereby the lamp may be adjusted to be received in the housing when the bellows is closed and positioned to extend from the bellows when in use, a concave reflector mounted on a plate adapted to be folded to protect the reflector when not in use and to hold the reflector to project light rays past the lamp when the device is in use and project an image of said filament on an object.

6. A focusing device for a camera, comprising a housing having a plate holder and a lens carried at one end of and movable with a bellows, an incandescent filament lamp, an adjustable bracket for said lamp mounted on said end of the bellows whereby the lamp may be adjusted to be received in the housing when the bellows is closed and positioned to extend from the bellows when in use, a concave reflector mounted on a plate adapted to be folded to protect the reflector when not in use and to hold the reflector to project light rays past the lamp when the device is in use and project an image of said filament on an object and means for holding said reflector when in use in such relation to said lamp that the projected image will be disposed substantially central with respect to the area to be exposed to a plate in said holder.

7. A focus indicating device for a camera having a lens movable relative to a holder for a photographically sensitive element, comprising an incandescent lamp having a concentrated filament, means for mounting said lamp in fixed relation to and movable with said lens, a concave reflector mounted on said holder for reflecting light rays past said lamp to project an image of said filament on an object and means on said lamp for reflecting light rays toward said reflector and for shielding said object from light rays not used to project said image.

SAMUEL MENDELSOHN.
LEON HARTMAN.